United States Patent
Cooke

[11] Patent Number: 5,934,643
[45] Date of Patent: Aug. 10, 1999

[54] VALVE ARRANGEMENT

[75] Inventor: Michael Peter Cooke, Gillingham, United Kingdom

[73] Assignee: Lucas Industries, United Kingdom

[21] Appl. No.: 08/756,437

[22] Filed: Nov. 26, 1996

[30] Foreign Application Priority Data

Dec. 23, 1995 [GB] United Kingdom ............... 9526522

[51] Int. Cl.⁶ ............................................. F16K 31/02
[52] U.S. Cl. ................. 251/129.01; 251/322; 239/585.5
[58] Field of Search .............. 251/129.01, 129.18, 251/129.21, 30.02, 30.04, 319, 320, 321, 322; 239/585.1, 585.4, 585.5

[56] References Cited

U.S. PATENT DOCUMENTS

| 3,154,285 | 10/1964 | Houle .................................. 251/30.04 |
| 4,030,668 | 6/1977 | Kiwior . | |

FOREIGN PATENT DOCUMENTS

| 0 372 712 | 6/1990 | European Pat. Off. . |
| 0 571 001 | 11/1993 | European Pat. Off. . |
| 0 604 914 | 7/1994 | European Pat. Off. . |
| 0 647 780 | 4/1995 | European Pat. Off. . |
| 0 652 394 | 5/1995 | European Pat. Off. . |
| 1 184 269 | 7/1959 | France . |
| 2 300 531 | 9/1976 | France . |
| 2 328 853 | 5/1977 | France . |
| 2 543 647 | 10/1984 | France . |
| 0745480 | 3/1944 | Germany ............................ 251/30.04 |
| 41 39 670 | 6/1993 | Germany . |
| 42 36 882 | 4/1994 | Germany . |
| 196 05 277 | 8/1996 | Germany . |
| 96 09473 | 3/1996 | WIPO . |

*Primary Examiner*—Kevin Lee
*Attorney, Agent, or Firm*—Ryndak & Lyerla

[57] ABSTRACT

A valve arrangement is disclosed which comprises a valve member engageable with a seating. The valve member includes a relatively flexible region whereby damage to the valve arrangement, in use, can be reduced and the tolerance to manufacturing inaccuracies can be improved. The valve member is conveniently shaped so that the application of fuel at high pressure thereto biases the valve member towards the seating. A further arrangement is disclosed in which the valve member is permitted to move laterally to center the valve on its seating, the application of fuel to the valve member biasing the valve member towards its seating. Another arrangement is disclosed in which the position of the seating is adjustable.

6 Claims, 9 Drawing Sheets

VALVE ARRANGEMENT

BACKGROUND OF THE INVENTION

This invention relates to a valve arrangement, and particularly to a control valve for use in controlling the operation of a fuel injector or other valve.

Figure 1:
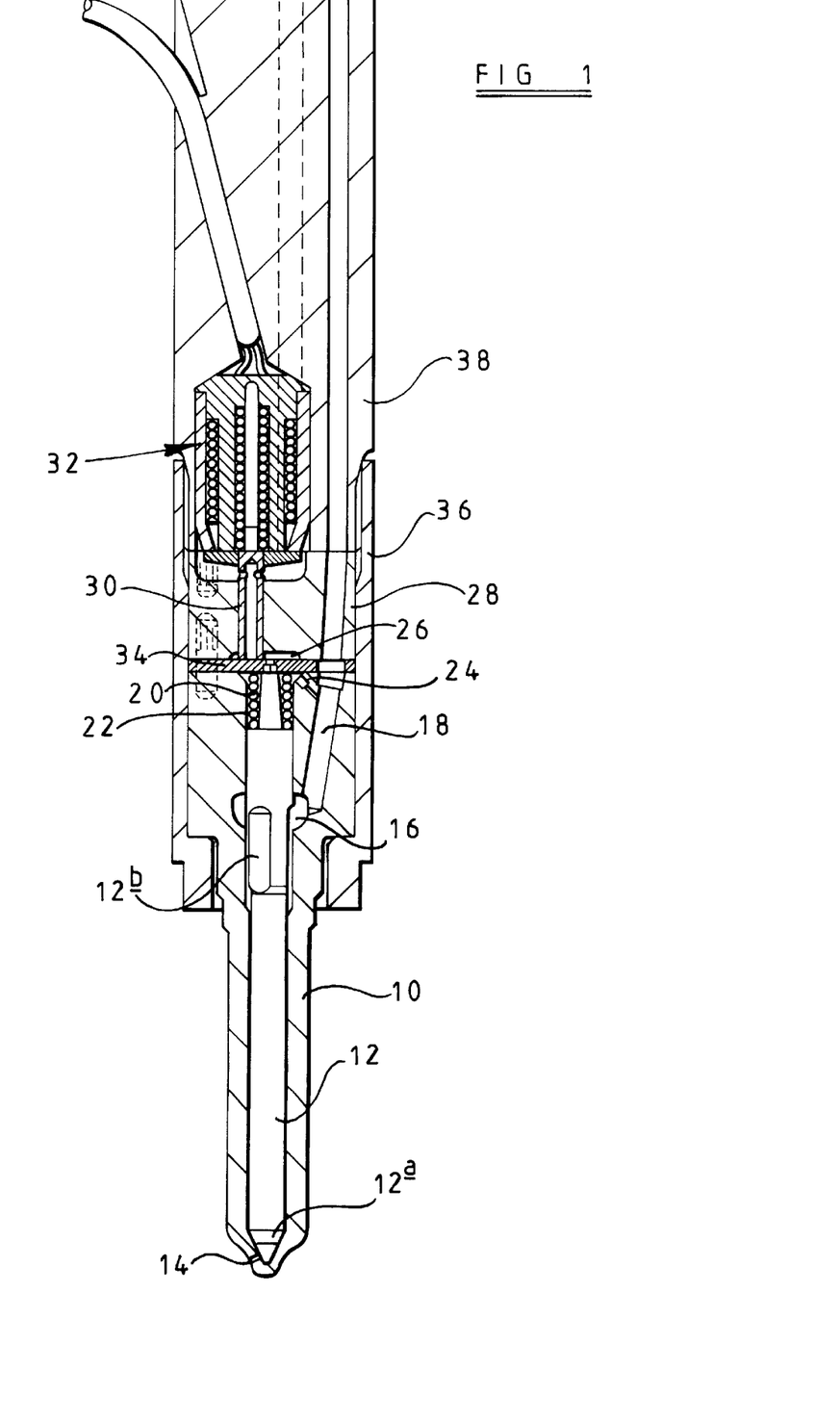
FIG. 1 is a cross-sectional view of part of fuel injector including a control valve.

FIG. 1 illustrates a fuel injection nozzle comprising a generally cylindrical nozzle body 10 having a bore within which a valve needle 12 is slidable. The valve needle 12 includes a region 12a which is engageable with a seating provided in the body 10 to control the flow of fuel to small apertures 14. The body 10 includes an annular gallery 16 arranged to be supplied with fuel through a supply line 18, the needle 12 including a fluted region 12b permitting fuel to flow from the gallery towards the seating.

The needle 12 is biased towards the seating by a spring 20 provided within a spring chamber 22, the spring chamber 22 being supplied with fuel from the supply line 18 through a restricter 24. The spring chamber 22 communicates with a chamber 26 provided in a distance piece 28, a tubular valve member 30 forming part of a control valve arrangement being slidable with respect to the distance piece 28 under the influence of a solenoid actuator arrangement 32 including a spring arranged to bias the valve member 30 into engagement with a seating defined by a second distance piece 34. A cap nut 36 secures the body 10 and first and second distance pieces 28, 34 to a nozzle holder 38 in which the solenoid actuator arrangement 32 is housed.

In use, the supply line 18 is connected to a source of high pressure fuel, the fuel acting against the angled surfaces of the valve needle 12 tending to lift it from the seating against the action of the spring 20 and the pressure of fuel in the spring chamber 22. In the position illustrated in FIG. 1, the spring 20 and pressure of fuel in the spring chamber 22 are sufficient to maintain the valve needle 12 in engagement with the seating.

In order to commence injection, the solenoid actuator arrangement 32 is energized to lift the valve member 30 away from the second distance piece 34. Such movement permits fuel to flow from the spring chamber 22 and chamber 26 through the valve member 30 to a suitable drain. The reduction in fuel pressure in the spring chamber 22 results in a condition being reached in which the combined effect of the spring 20 and fuel pressure within the spring chamber 22 is insufficient to maintain the engagement between the valve needle 12 and seating, whereon fuel is permitted to flow past the seating and through the outlets 14.

To terminate injection, the solenoid actuator arrangement 32 is de-energized, the spring thereof returning the valve member 30 to the position illustrated in FIG. 1. Such movement results in the fuel pressure within the spring chamber 22 increasing, and in due course in the effect of the spring 20 and the pressure of fuel within the spring chamber 22 being sufficient to move the valve needle 12 into engagement with the seating.

It has been found that the control valve member 30 is relatively difficult to produce, slight inaccuracies in production resulting in poor injector performance. In addition, in use, damage to the valve member 30 and second distance piece 34 tends to occur, damage to the valve member 30 possibly resulting in a tendency for the valve member 30 to be lifted from the second distance piece 34 on the application of high pressure thereto.

Although the above description is of the use of the valve arrangement in a fuel injector, the valve arrangement may be used in other applications.

SUMMARY OF THE INVENTION

According to a first aspect of the invention there is provided a valve arrangement comprising a valve member engageable with a seating, wherein the region of the valve member arranged to engage the seating is relatively flexible.

The valve member may be of tubular form, fuel being permitted to flow through the valve member when the valve member is spaced from the seating.

Alternatively, the valve member may be arranged to obscure a drain passage when the valve member engages the seating, fuel being permitted to flow to the drain passage when the valve member is spaced from the seating.

The valve member is conveniently shaped such that the application of high pressure fuel thereto when the valve member engages the seating urges the valve member towards the seating.

According to another aspect of the invention there is provided a valve arrangement comprising a valve member slidable within a bore and engageable with a frusto-conical seating, the valve member being provided with a bore within which a piston member is slidable, the valve member and piston member defining a chamber which communicates through an opening in the valve member with the fluid pressure upstream of the seating, wherein the chamber is shaped such that when the valve member engages its seating, the net force applied to the valve member due to the pressure within the chamber acts in a direction urging the valve member to remain in engagement with the seating.

In a further aspect of the invention, a moveable planar valve member is engageable with an annular seating defined by an end of a tubular member, the axial postion of the tubular member being adjustable to adjust the position of the seating.

BRIEF DESCRIPTION OF THE DRAWINGS

The invention will further be described, by way of example, with reference to the accompanying drawings, in which like reference numerals denote like parts, and in which.

DETAILED DESCRIPTION OF THE PREFERRED EMBODIMENTS

The control valve arrangements illustrated in FIGS. 2 to 8 each differ from that illustrated in FIG. 1 in that the spring chamber 22 is provided in the second distance piece 34, a projection 40 extending into the spring chamber 22 in order to provide guidance for a spring equivalent to the spring 20 illustrated in FIG. 1, but not shown in FIGS. 2 to 8. The projection 40 includes an axially extending passage 42 which communicates through a passage 44 with an annular chamber 46 defined by the first and second distance pieces 28, 34.

Figure 2:
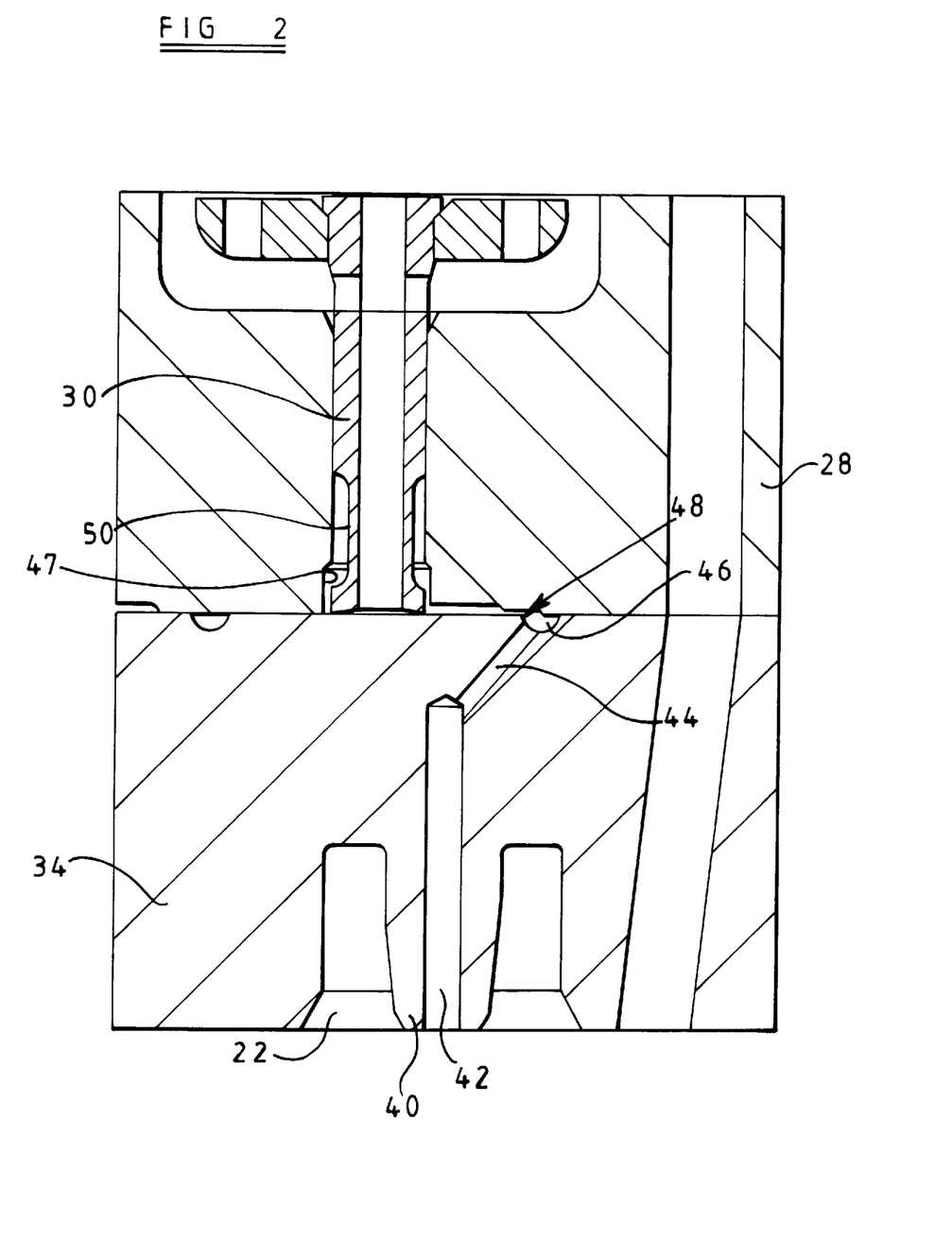
FIGS. 2 to 9 are cross-sectional diagrammatic views of valve arrangements in accordance with embodiments of the invention.

In the arrangement illustrated in FIG. 2, the annular chamber 46 communicates with a chamber 47 provided in the first distance piece 28, the chamber 47 communicating with a bore within which a tubular control valve member 30 is slidable. The communication between the annular chamber 46 and the chamber 47 provided in the first distance piece 28 takes the form of an edge filter 48 arranged to prevent the flow of relatively large particles from the annular chamber 46 to the chamber 47 provided in the first distance piece 28.

The control valve member 30 takes the form of a hollow tube, the outer surface of the control valve member 30 including a region 50 of reduced diameter, and as shown in FIG. 2, an end of the control valve member 30 which is arranged to abut a planar surface of the second distance piece 34 is of the same diameter as the main portion of the control valve member 30. The end surface of the control valve member 30 which is arranged to abut the second distance piece 34 is machined so as to be of frusto-conical shape having a large cone angle, thus engagement between the control valve member 30 and the second distance piece 34 is along an annular line adjacent the outer periphery of the control valve member 30.

Operation of this arrangement is similar to that described with reference to FIG. 1, but it will be recognised that the provision of the reduced diameter region 50 results in the end region of the control valve member 30 being relatively flexible, thus in use there is a tendency for flexing of the end region to occur, such flexing tending to result in less deformation to the second distance piece 34. The flexibility of the end of the control valve member 30 further permits the end of the control valve member 30 to bend to allow for any inaccuracies which occur during machining of the control valve member 30 and the corresponding part of the second distance piece 34.

Figure 3:
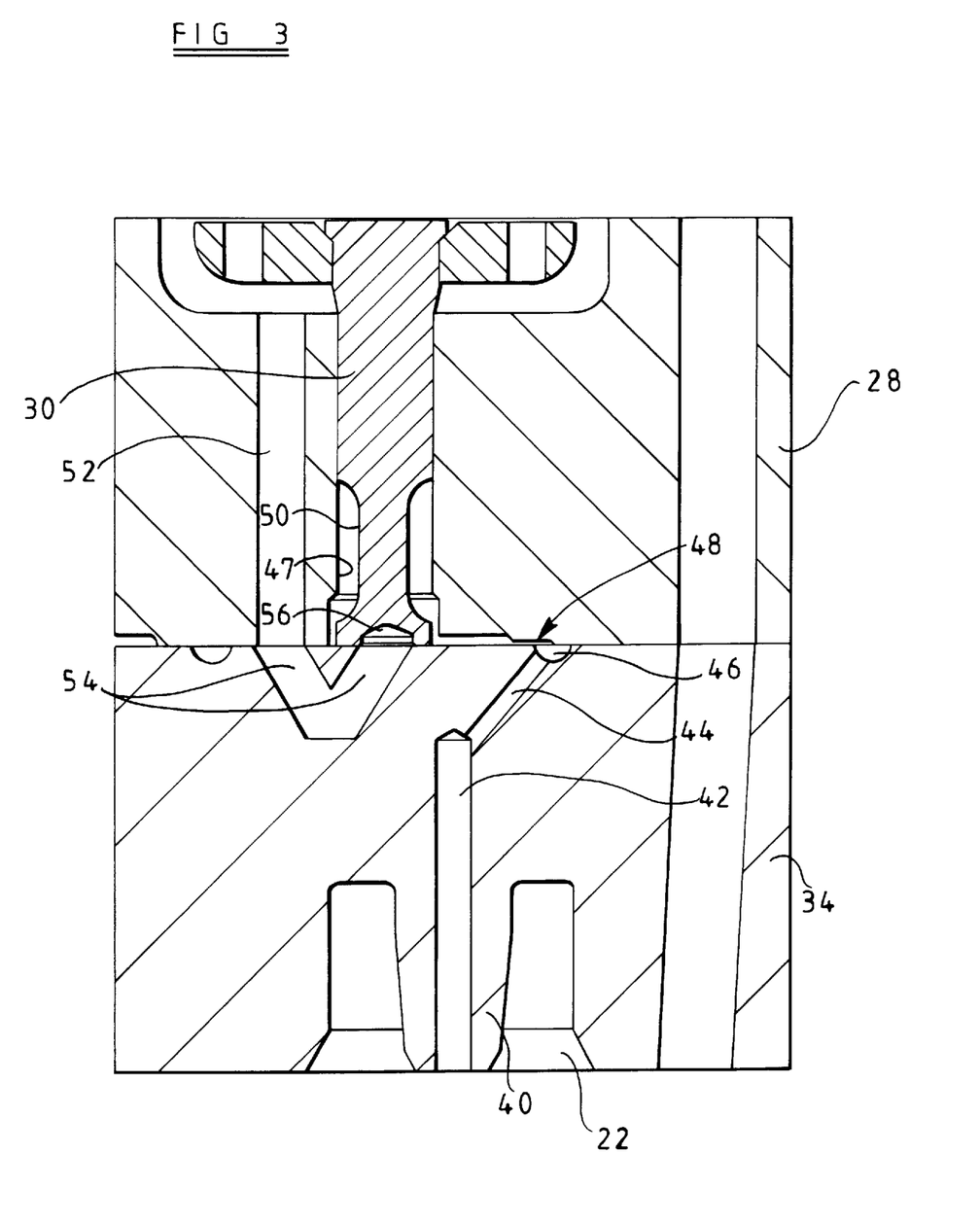

The arrangement illustrated in FIG. 3 is similar to that illustrated in FIG. 2, but instead of the control valve member 30 being of hollow form, a flow passage 52 is provided in the first distance piece 28, the flow passage 52 communicating with passages 54 provided in the second distance piece 34. The passages 54 communicate with a recess 56 provided in the end surface of the control valve member 30. As in the embodiment illustrated in FIG. 2, the end surface of the control valve member 30 is of frusto-conical shape, thus engagement between the control valve member 30 and the second distance piece 34 is along an annular line adjacent the outer peripheral surface of the control valve member 30.

In use, when the control valve member 30 is in the position illustrated in FIG. 3, high pressure fuel is applied to the chamber 47. On energizing the solenoid actuator arrangement 32, the control valve member 30 is lifted away from the second distance piece 34, thus fuel is permitted to flow from the chamber 47 through the passages 54 provided in the second distance piece 34 and the passage 52 provided in the first distance piece 28 to a suitable drain.

As with the arrangement illustrated in FIG. 2, this arrangement is advantageous in that the end region of the control valve member 30 arranged to engage the second distance piece 34, in use, is relatively flexible permitting the control valve member 30 to bend to allow for any inaccuracies occurring during construction of the valve arrangement. By providing a separate flow passage 52 rather than providing a passage extending through the control valve member 30, the diameter of the reduced diameter region 50 can be reduced thus increasing the flexibility of the control valve member 30.

The arrangement illustrated in FIG. 4 again includes a chamber 47 provided in the first distance piece 28 which communicates with the annular chamber 46 through an annular edge filter 48. In this arrangement, the outer diameter of the end region of the control valve member 30 which engages the second distance piece 34, in use, is of slightly larger outer diameter than the remainder of the control valve member 30, the control valve member 30 including a reduced diameter region 50 as in the embodiments illustrated in FIGS. 2 and 3. By providing the control valve member 30 with an enlarged diameter lower region, it will be recognised that on applying high pressure fuel to the chamber 47 when the valve member 30 is in engagement with the second distance piece 34, the action of the high pressure fuel on the control valve member 30 urges the control valve member 30 in a direction to maintain engagement with the second distance piece 34. Thus, the force of the spring used to hold the valve member 30 in engagement with the second distance piece 34 can be reduced. As with the embodiments illustrated in FIGS. 2 and 3, the provision of the reduced diameter portion 50 results in the lower end region of the control valve member 30 being of increased flexibility.

Figure 4:
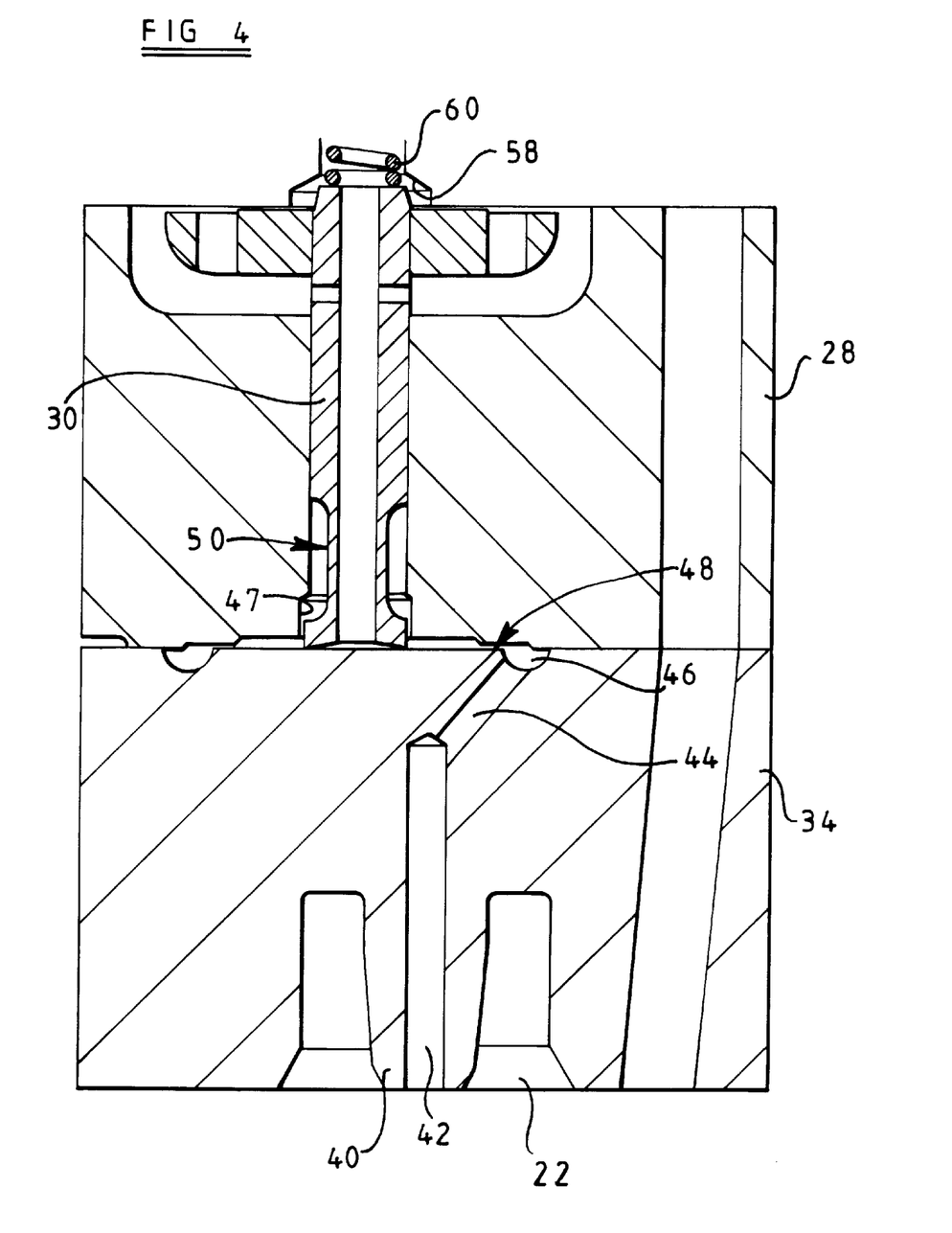

As illustrated in FIG. 4, the control valve member 30 includes an axially extending passage the upper end of which communicates with a chamber 58 provided in the end face of the solenoid of the actuator arrangement 32 and within which a spring 60 is provided to bias the control valve member 30 towards the second distance piece 34. When the control valve member 30 is lifted from the second distance piece 34, high pressure fuel is supplied to the chamber 58 through the passage of the control valve member 30, thus the force tending to move the control valve member 30 into engagement with the second distance piece 34 is increased compared to the case where fuel is not supplied to the chamber 58. When the solenoid actuator arrangement 32 is deenergized, the presence of the high pressure fuel in the chamber 58 acting upon the end of the control valve member 30 results in the control valve member 30 engaging the second distance piece 34 more rapidly than is the case where fuel is not supplied to the chamber 58.

In use, as the valve member 30 is lifted from the second distance piece 34, the gap between the armature and the solenoid decreases with a corresponding increase in the fuel pressure therebetween cushioning the final part of the movement of the armature when the fuel pressure applied to the chamber 47 is relatively low, for example during starting and idling when the rail pressure may fall within the range of approximately 150 to approximately 300 bar. On applying higher pressure fuel thereto (for example fuel at approximately 1600 bar), the movement of the armature may be stopped prior to engagement occurring between the armature and the solenoid due to the fuel pressure therebetween.

As the fuel pressure acts directly on the armature, the connection between the armature and the valve member 30 may be of relatively low strength, for example an interference fit between a cylindrical part of the valve member 30 and the armature rather than requiring the presence of a step as in the embodiments illustrated in FIGS. 2 and 3. Such a connection permits setting of the maximum possible lift of the valve member 30 from the seating.

Figure 5:
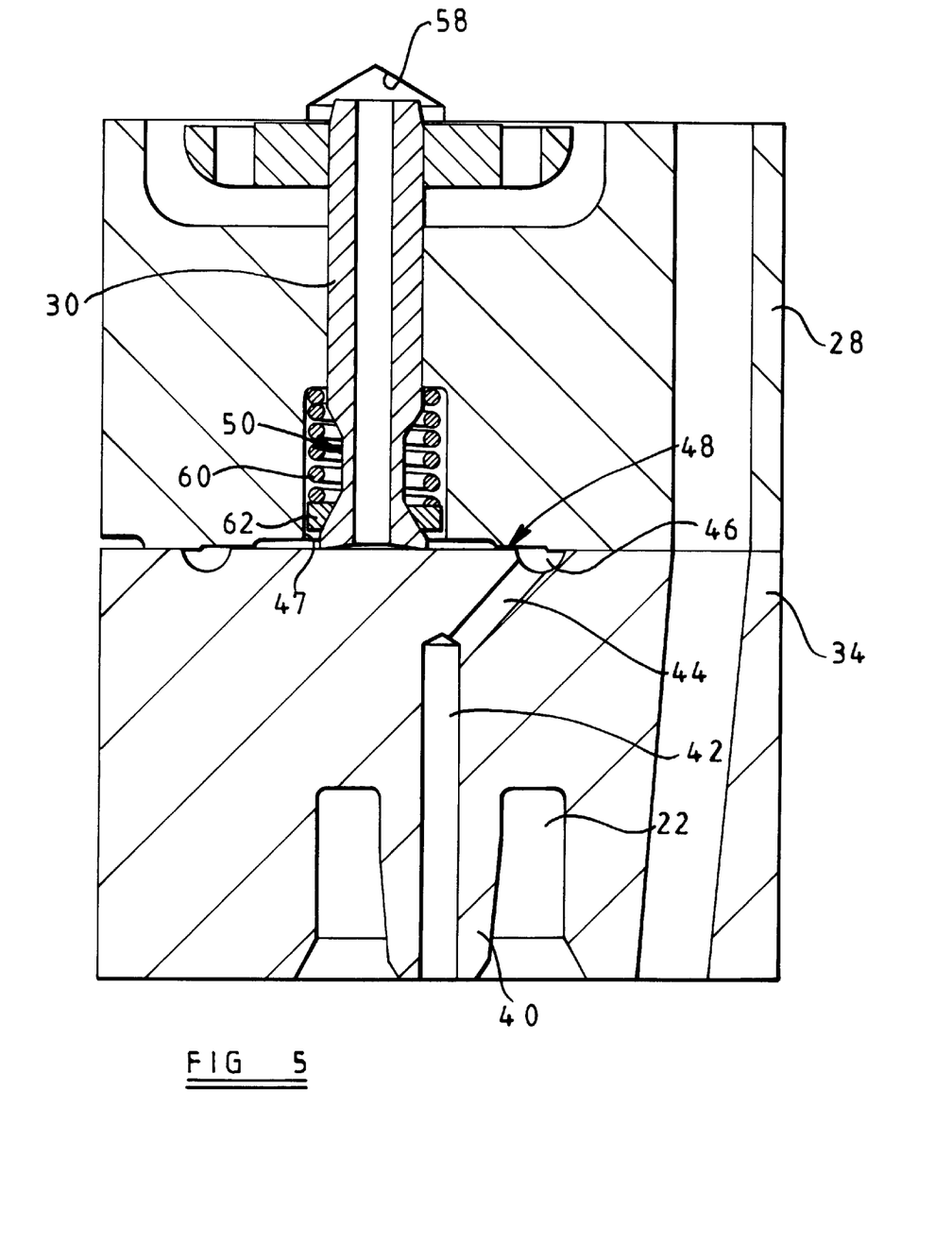

The arrangement illustrated in FIG. 5 is similar to that illustrated in FIG. 4, the spring 60 having been relocated from the chamber 58 to the chamber 47 provided in the first distance piece 28, the spring 60 acting against a washer 62 secured to the control valve member 30. The relocation of the spring 60 permits a greater area of the solenoid actuator arrangement 32 to be exposed to the armature connected to the control valve member 30 thus the efficiency of the solenoid actuator arrangement 32 is improved.

As in the embodiment of FIG. 4, the lower end of the control valve member 30 is of enlarged diameter thus the application of fuel to the chamber 47 tends to move the control valve member 30 into engagement with the second distance piece 34. The control valve member 30 is arranged to supply fuel to the chamber 58 as in the arrangement of FIG. 4 such that on de-energizing the solenoid actuator arrangement 32, the control valve member 30 moves into engagement with the second distance piece 34 relatively quickly.

Figure 6:
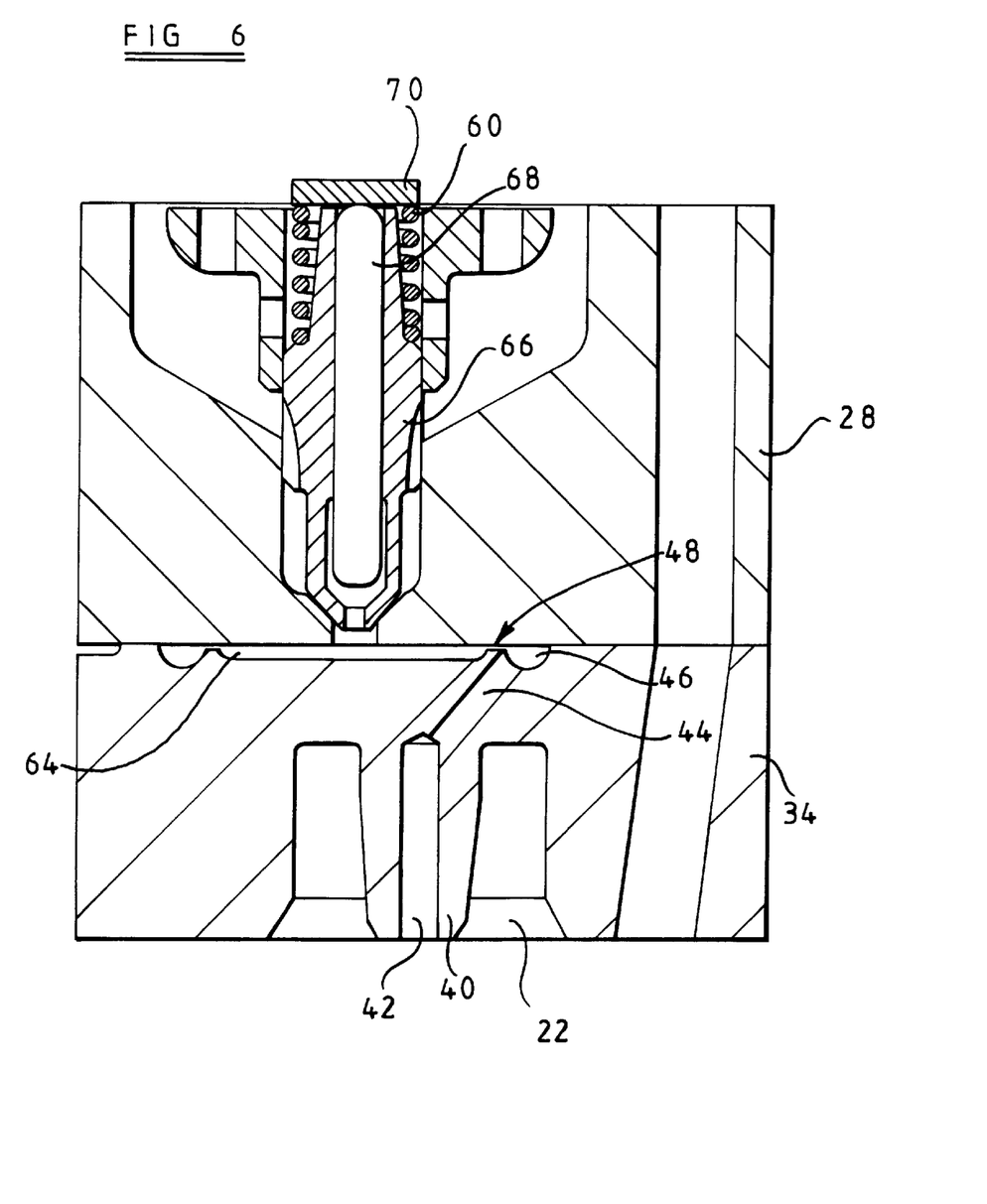

An arrangement is illustrated in FIG. 6 in which the annular chamber 46 communicates with a chamber 64 provided in the end face of the second distance piece 34 through an annular edge filter 48 as described above.

The first distance piece 28 is provided with a through bore within which a tubular valve member 66 is slidable. The bore includes a conical seating with which a conical end region of the valve member 66 is engageable, the valve member 66 including fluted regions which are arranged to engage the through bore of the first distance piece 28 so as to guide the end of the valve member 66 generally into the conical seating. The valve member 66 is connected to an armature and is moveable under the influence of the solenoid actuator arrangement 32, a spring 60 being provided to bias the valve member 66 into engagement with the seating, the spring force being sufficiently great to cause any necessary lateral movement of the valve member 66 to accurately align the valve member 66 with the seating. The valve member 66 includes a through passage within which a piston member or plunger 68 is slidable. One end of the plunger 68 is arranged to engage a stop 70 with which the spring 60 engages, the region of the bore within which the other end of the plunger 68 extends being of enlarged diameter. As illustrated in the drawing, the plunger 68 is of slightly larger diameter than the seating, thus the application of high pressure fuel to the chamber 64, and hence to the bore of the valve member 66 tends to assist the spring 60 in maintaining the engagement between the valve member 66 and seating.

On energization of the solenoid actuator arrangement 32, the armature and the valve member 66 are lifted, thus lifting the end of the valve member 66 from the seating and permitting high pressure fuel to escape to a suitable drain between the valve member 66 and seating. The engagement of the plunger 68 with the stop 70 tends to limit transverse movement of the valve member 66. Thus the plunger 68 acts as a guide, assisting the fluted regions of the valve member 66 in guiding movement of the valve member 66 to generally align the end thereof with the seating.

When the solenoid actuator arrangement 32 is de-energized, the valve member 66 moves under the influence of the spring 60 to move the end of the valve member 66 into engagement with the seating and hence terminates the flow of fuel to the suitable drain.

Figure 7:
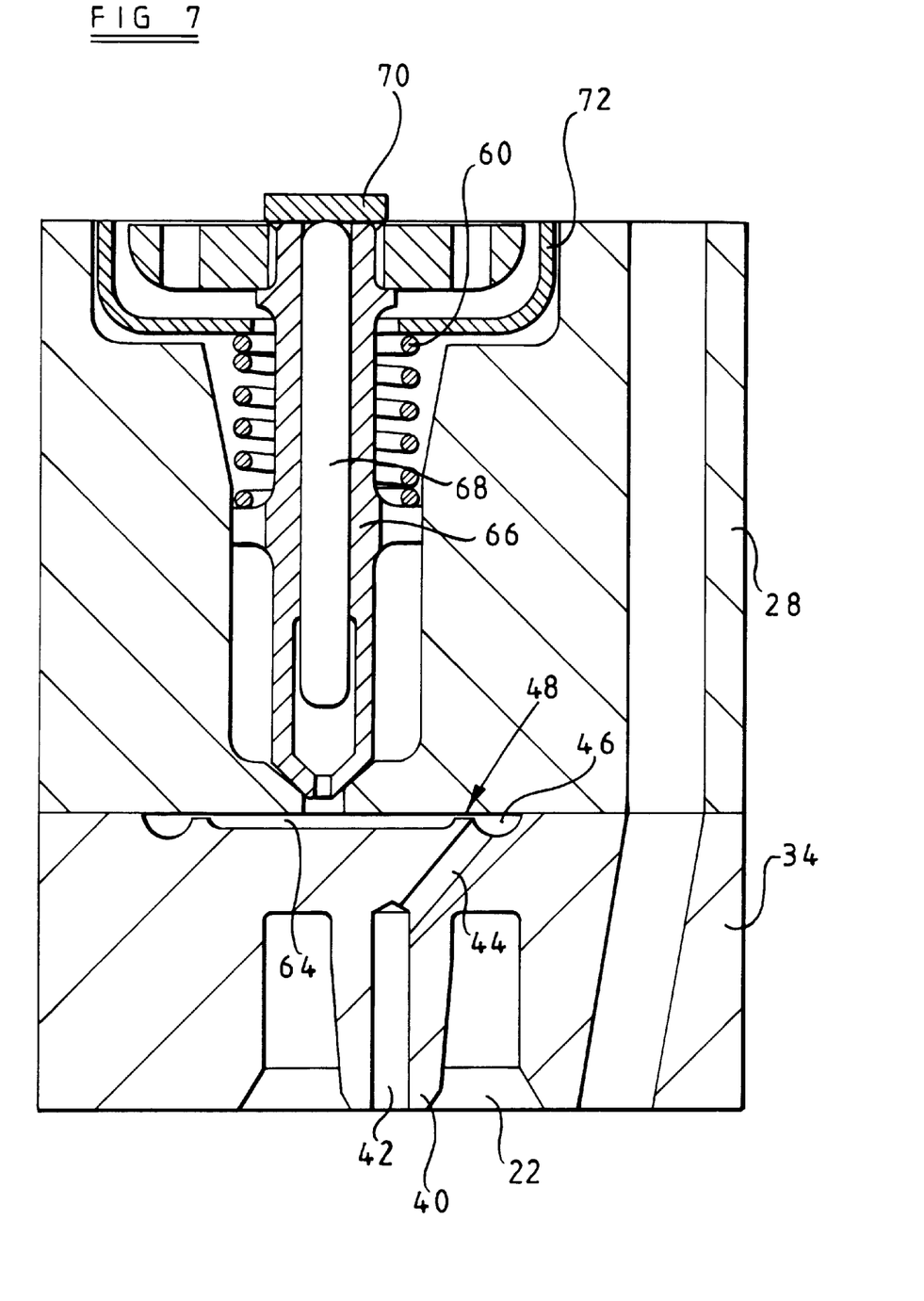

The arrangement illustrated in FIG. 7 is similar to that of FIG. 6, the spring 60 no longer engaging the stop 70 but instead being engaged between the flutes of the valve member 66 and a separate stop arrangement 72. Operation of this arrangement is as described with reference to FIG. 6.

In the arrangements illustrated in FIGS. 6 and 7, the plunger 68 may take the form of a needle roller.

Figure 8:
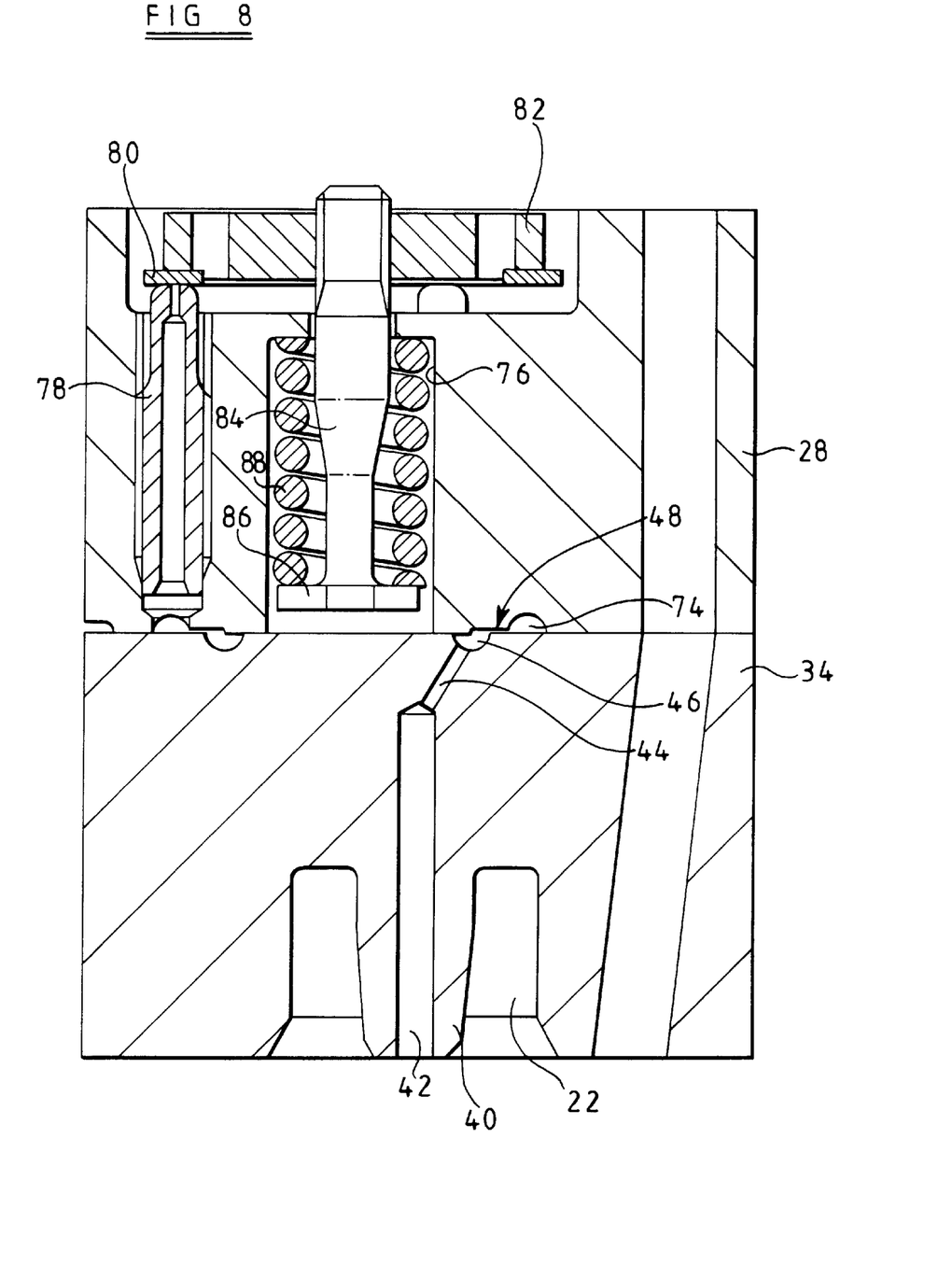

FIG. 8 illustrates an embodiment in which the annular chamber 46 communicates with a further annular chamber 74 through an annular edge filter 48. The annular chamber 74 is of larger diameter than the annular chamber 46. The annular chamber 74 communicates with three axially extending through bores which are equiangularly spaced around a chamber 76.

The inner surface of each of the through bores is threaded, and a tubular member 78 is in screw-threaded engagement within each of the bores. The tubular members 78 each include an axially extending passage, the end of each member 78 remote from the second distance piece 34 forming a substantially flat seating against which a common annular valve member 80 is engageable.

The valve member 80 is secured to the armature 82 and is hence moveable under the influence of the solenoid actuator arrangement 32. The armature 82 is connected to a central shaft 84 the lower end of which is provided within the chamber 76 and includes an enlarged head 86 defining a spring abutment, a spring 88 being engaged between the enlarged head 86 and the first distance piece 28 thus biasing the valve member 80 into engagement with the seatings.

In use, when fuel is to be delivered by the injector, the solenoid actuator arrangement 32 is energized lifting the armature 82 against the action of the spring 88 thus permitting fuel to flow through the tubular members 78 to a suitable drain. On de-energizing the solenoid actuator arrangement 32, the armature 82 moves under the influence of the spring 88 back to the position illustrated in FIG. 8 thus terminating the flow of fuel to drain.

The surface of the armature 82 which faces the solenoid actuator arrangement 32 is dished, movement of the armature being stopped by direct contact of the outer edge of the armature 82 with the core of the solenoid actuator arrangement 32. The construction of the solenoid actuator arrangement 32 can therefore be simplified as no additional movement limiter is required from the armature.

The provision of a plurality of separate valves requires a smaller amount of movement of the valve element than would be the case if a single, relatively large, valve were provided. The provision of the tubular members 78 in screw-threaded bores permits adjustment of each of the valves independently of the other valves, and once the correct positioning of each tubular member 78 has been achieved, anaerobic adhesive may be used to secure the members 78 in position. Alternatively, the lower part of each member 78 may be deformed once the correct position has been achieved to prevent rotation, and hence axial movement of the tubular members 78. The shaft 84 is in screw-threaded engagement with the armature 82, thus the effective length of the shaft 84 can be adjusted by rotating the shaft 84 with respect to the armature 82. It will be recognised that such rotation adjusts the level of pre-stressing of the spring 88. As with the tubular members 78, once the correct level of pre-stressing of the spring 88 has been achieved, anaerobic adhesive may be used to prevent further rotation of the shaft 84 with respect to the armature 82, and hence to prevent further adjustment of the level of pre-stressing of the spring 88. It will be understood that by providing the spring 88 in the chamber 76 rather than between the solenoid and the armature 82, the efficiency of the solenoid actuator arrangement 32 is improved.

Figure 9:
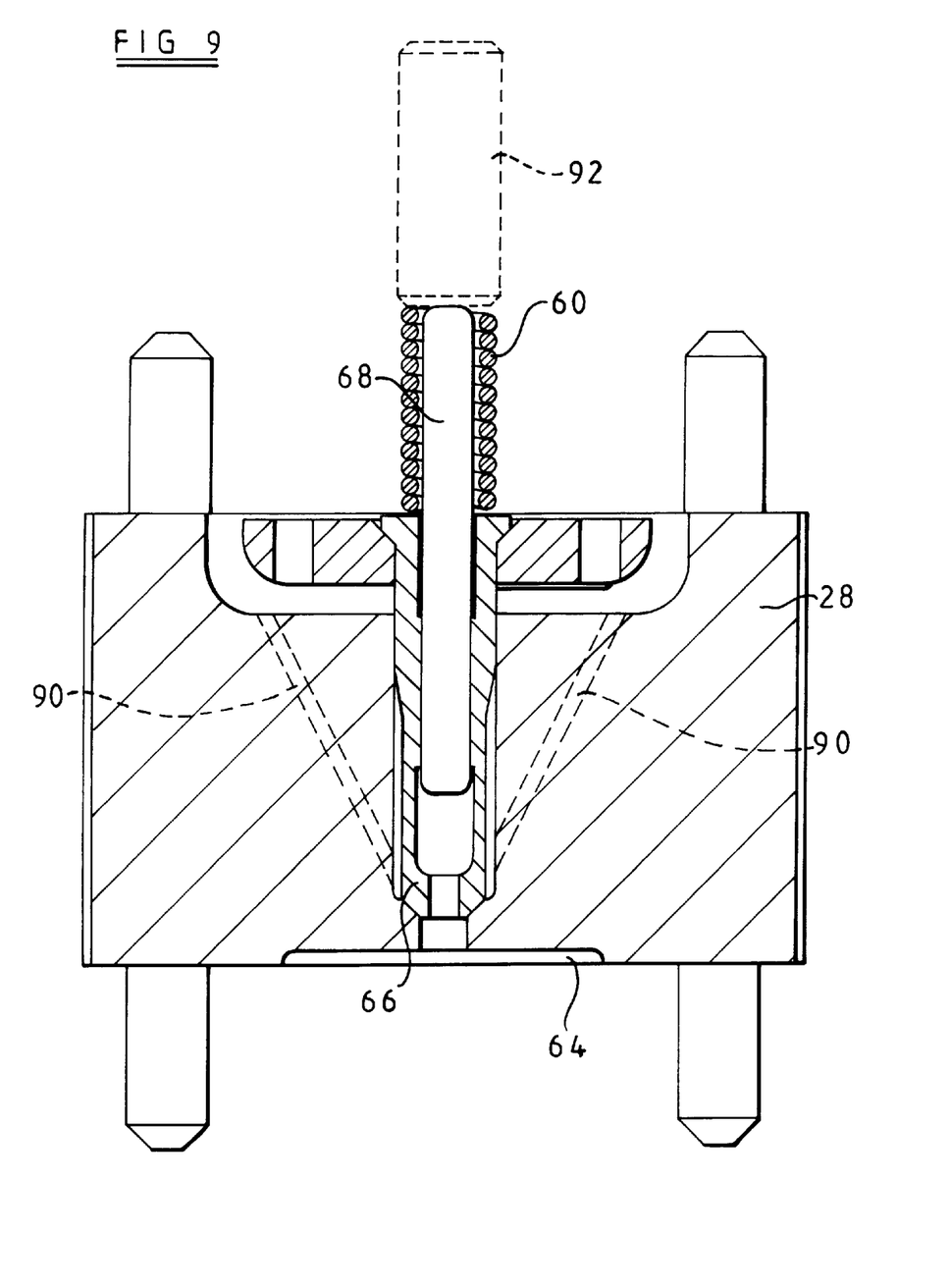

The arrangement illustrated in FIG. 9 is similar to that of FIG. 6 but differs therefrom in that rather than shaping the valve member 66 to include a fluted region permitting fuel to flow along the bore, the FIG. 9 arrangement includes a plurality of passages 90 which communicate with a part of the bore adjacent the conical seating and with an enlarged part of the bore within which the armature is housed. This arrangement further differs from that of FIG. 6 in that the spring 60 acts between a stop 92 and an end of the valve member 66, the plunger 68 being arranged to engage the stop 92. It will be noted that the valve member 66 includes a step which is received within a corresponding recess provided on the armature.

Another difference between the arrangement of FIG. 9 and that of FIG. 6 is that the chamber 64 is provided in the first distance piece 28 rather than in the second distance piece 34.

Operation of the arrangement of FIG. 9 is as described with reference to FIG. 6, other than the flow path of fuel is through the passages 90 rather than along the length of the bore.

We claim:

1. A valve arrangement comprising a valve member slidable within a bore and engageable with a frusto-conical seating to control communication between an inlet port and an outlet port, the valve member being provided with a bore within which a piston member is slidable, the valve member and piston member defining a chamber which is in constant communication through an opening provided in the valve member with the inlet port, wherein the chamber is shaped such that the net force applied to the valve member by fluid under pressure supplied to the inlet port during use of the valve arrangement when the valve member engages its seating acts in a direction urging the valve member to remain in engagement with its seating.

2. A valve arrangement as claimed in claim 1, wherein the piston member is arranged to engage a stop restricting axial movement of the piston member with respect to the seating.

3. A valve arrangement as claimed in claim 1, wherein the valve member is biased towards its seating by a spring, the spring engaging an end of the valve member spaced from the seating.

4. A valve arrangement as claimed in claim 1, wherein the valve member is biased towards its seating by a spring, the spring engaging a spring abutment associated with the valve member spaced from the ends thereof.

5. A valve arrangement as claimed in claim 1, wherein the valve member is moveable under the influence of an electromagnetic actuator, the actuator including an armature connected to the valve member.

6. A fuel injector comprising a valve needle slidable within a bore, the valve needle being influenced by the pressure within a control chamber, and a valve arrangement as claimed in claim 1 arranged to control the fuel pressure within the control chamber.

* * * * *